Oct. 30, 1923.
R. NICHOLS ET AL
1,472,191
FLUSH VALVE
Filed Nov. 15, 1920
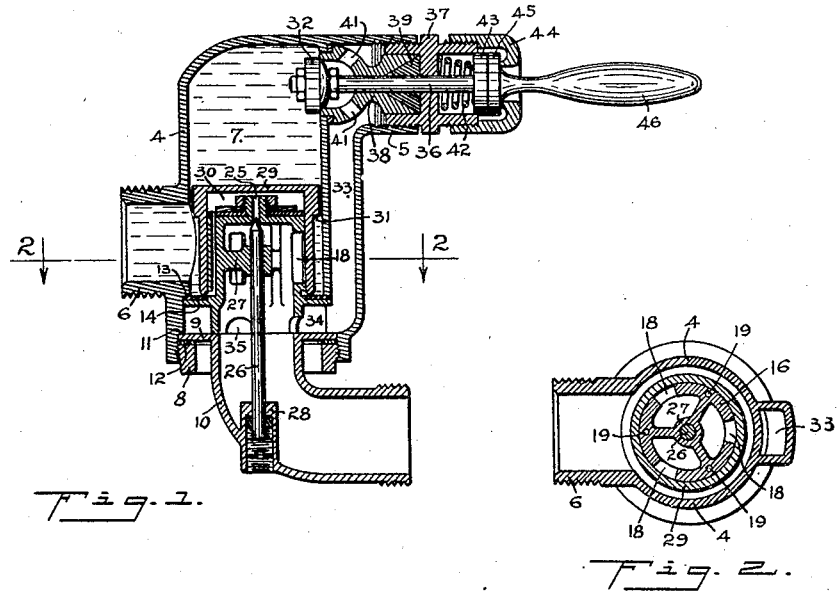
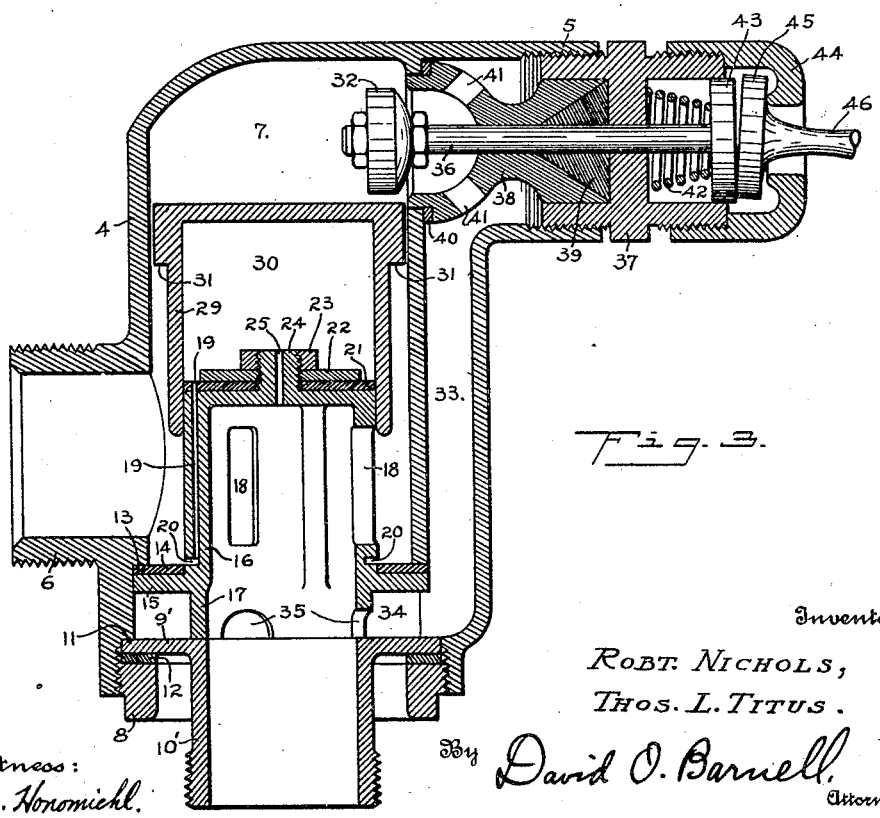
Inventors:
ROBT. NICHOLS,
THOS. L. TITUS.
By David O. Barnell
Attorney
Witness:
R. J. Honomichl.

Patented Oct. 30, 1923.

1,472,191

UNITED STATES PATENT OFFICE.

ROBERT NICHOLS AND THOMAS L. TITUS, OF OMAHA, NEBRASKA.

FLUSH VALVE.

Application filed November 15, 1920. Serial No. 424,190.

*To all whom it may concern:*

Be it known that we, ROBERT NICHOLS and THOMAS L. TITUS, citizens of the United States, and residents of Omaha, in the county of Douglas and State of Nebraska, have invented certain new and useful Improvements in Flush Valves, of which the following is a specification.

Our invention relates to valves for controlling the flushing of water closets and the like, and particularly to valves of this type with which the water is admitted to the closet directly from the source of supply, the opening of the flush-valve being initiated manually, and the valve closing automatically after a predetermined period of opening. It is the object of our invention to provide a valve of this general character, of simple and inexpensive construction, capable of certain and precise operation, and with such durability as to enable extensive operation thereof without repairs, adjustments or other attention. More particular objects of our invention will appear hereinafter.

Structures embodying our invention are shown in the accompanying drawings, in which Fig. 1 is a vertical sectional view of the valve in closed position, Fig. 2 is a horizontal section thereof on the plane of the line 2—2 of Fig. 1, and Fig. 3 is a detail vertical section showing the valve in open position, and illustrating a slight modification of the structure, whereby the vent-adjusting means is omitted.

In the illustrated construction we provide a main body-member 4 of substantially cylindrical form, having at the upper end thereof a laterally extending internally threaded neck-portion 5, and having at the lower intermediate portion a laterally extending externally threaded neck 6. The upper end of the body-member is closed so as to form therein a pressure-chamber 7. The lower end of the body-member is outwardly shouldered and internally threaded to receive an annular nut 8. In the structure shown in Fig. 1, said annular nut 8 serves to detachably connect with the body-member the flanged end 9 of the elbow 10, by pressing said end-flange 9 against the shoulder 11, a gasket 12 being disposed between the flange and the end-face of the nut, as shown. In the modified structure shown in Fig. 3, the annular nut 8 holds the end-flange 9' of the nipple 10' against the shoulder 11. In the body-member above the shoulder 11 there is a second shoulder 13, and beneath said shoulder is a gasket 14 which is held against the shoulder by a seat-flange 15 which extends out from the lower part of a dome-like member 16. An annular portion 17 is formed integrally with and extends downwardly from the seat-flange 15 so as to rest upon the upper end of the elbow 10, which thus supports the dome-member and presses the flange 15 toward the shoulder 13. The dome-member extends up into the cylindrical body-member concentrically therewith, terminating near the level of the upper edge of the opening through the neck 6. In the sides of the dome-member are a plurality of large radial ports 18, and also a plurality of small vertically extending ports 19, the lower ends of the latter ports communicating with an annular groove 20 adjoining the upper edge of the gasket 14, and the upper ends of said ports extending through a packing-disk 21 disposed on the upper end of the dome. Said packing-disk is retained in place by a washer 22 and a nut 23 which is screwed onto a threaded nipple 24 extending above the end of the dome. A small port or vent 25 extends vertically through the nipple 24, and, in the structure shown in Fig. 1, the effective opening through said port or vent is controlled by a needle-valve 26, the stem of said valve extending through a guide 27 formed integrally with the dome, and the head portion of the valve-stem being threaded and screwed within a boss 28 on the elbow 10. In the structure shown in Fig. 3 the needle-valve and the guide 27 are omitted, so that the effective opening or area of the vent 25 is not variable.

The main valve is a cup-shaped member 29 which fits slidably over the dome 16, so as to form above said dome a balancing-chamber 30 with which the ports 19 and the vent 25 communicate. The upper portion of the valve-member 29 is of such diameter as to fit loosely within the bore of the body-member 4, there being a shoulder 31 formed at the lower edge of the enlarged head-portion of the valve. The lower edge of the cup-shaped valve-member 29 is adapted to seat upon the inner portion of the gasket 14, to form a fluid-tight joint with the seat-flange 15. When the valve is in use the water supply pipe is connected with the neck 6 of the body-member, and the main valve is held down against its seat on the gasket 14 by the pressure of the water in the chamber 7, the water entering said chamber through the loose joint between the head-portion of the valve and the inner surface of the body-member. A manually-controlled relief-valve 32 is provided, for reducing the water pressure within the chamber 7, said valve being arranged as follows: The passage through the neck 5 of the body-member communicates with the chamber 7 through an opening in the side thereof, and also communicates with a vertical passage 33 extending down at the side of the body-member and turning inwardly at its lower end so as to connect with the annular chamber 34 around the part 17 and beneath the seat-flange 15. Ports 35 open through the part 17 from the chamber 34 to the main discharge passage through the elbow 10, or through the connecting nipple 10' in the structure shown in Fig. 3. The relief-valve 32 is carried at the inner end of a stem 36 which extends slidably through a gland 37 screwed into the neck-portion 5. The inner portion of the gland is chambered to receive the outer portion of a member 38 which is conically recessed to receive a packing 39 around the valve-stem. The inner end of the member 38 fits into the opening to the pressure-chamber 7, a gasket 40 being provided to insure a fluid-tight joint between the parts. The seat for the valve 32 is formed at the inner end of the member 38, and the opening through the seat is connected by ports 41 with the passage 33. The relief-valve is normally held closed by means of a spring 42 disposed within a recess in the outer portion of the gland and pressing outwardly upon a cylindrical head 43 secured on the valve-stem 36. A cap 44 is screwed onto the outer portion of the gland 37 and holds the head 45 of a tilting handle 46 against the head 43 on the relief-valve-stem.

By moving the tilting handle 46 in any direction the relief-valve is pushed inwardly as shown in Fig. 3, and the water-pressure in the chamber 7 is relieved through the passage 33, the parts being so proportioned that the water in said chamber 7 can escape through the relief valve at a greater rate than it can enter the chamber 7 through the loose joint around the head of the main valve. Upon the release of the water pressure from the chamber 7, the pressure of the water from the supply pipe against the shoulder 31 of the main valve raises said valve to a position as that shown in Fig. 3. When the valve is in said raised position a large volume of water can pass directly from the supply pipe through the ports 18 to the discharge passage through the elbow 10, or through the nipple 10' in the structure shown in Fig. 3, said members being connected with the bowl or other device to be flushed by the action of the valve. As the main valve is raised from its seat 14, water is admitted through the groove 20 to the small vertical ports 19 so as to pass up through said ports into the chamber 30 within the main valve and above the dome 16, thereby filling said chamber with water as it is enlarged by the lifting of the main valve. When the relief-valve 32 is closed, further escape of water from the chamber 7 is prevented, and the pressure of water in said chamber again becomes the same as that from the supply pipe around the valve beneath the shoulder 31, the water passing into the chamber 7 through the loose joint around the head of the main valve. Upon the restoration of water pressure in the chamber 7, the same tends to press the main valve downwardly to its seat, whereby to close the ports 18 and stop the flushing action. But the downward movement of the valve is retarded and timed by the water in the chamber 30, which exerts a partial counterbalancing pressure upon the valve. The rate at which the valve will move toward the closed position, and consequently the time that the flushing action will be continued, is dependent upon the area of the vent 25 proportionally to the area of the ports 19, and is dependent also to a limited extent upon the weight of the valve itself, although the balance of pressures is the principal factor in determining the time of the closing operation. When the vent-adjusting needle-valve 26 is used, as in Fig. 1, the period of operation may be varied from the minimum, which occurs when the vent is fully open, to a maximum depending upon the extent to which the vent is restricted by the needle-valve.

From the foregoing it will be seen that a flushing valve embodying our invention may be of simple and inexpensive construction, and not liable to become defective in its operation through wear or deterioration of its parts. The relief-valve in closing is actuated only by the spring 42, and thus gently engages its seat, there being substantially no water pressure in the chamber 7 at such times. Wear upon said valve, by forcible closing under pressure of the water, is thus avoided. The main valve also moves to closing position slowly and engages its seat gently, whereby rapid wear or deterioration of seat is obviated. The main valve, by fitting loosely within the body-member, is not subject to wear, and cannot stick and become inoperative by reason of swelling of packing or the like. Wear of the slidably contacting surfaces of the dome 16 and the main valve, or wear of the packing-disk 21, will not materially impair the operativeness of the valve, as the effect of such wear is substantially the same as a slight enlarging of the feed-ports 19, and results merely in slightly delaying the closing of the valve, although the reduced friction between the worn parts tends, on the other hand, to cause a more rapid closing action.

For comparative purposes, the head-portion of the main valve may be regarded as a piston movable within the cylinder formed by the upper portion of the body-member, and the lower portion of the main valve may be regarded as a movable cylinder enclosing the stationary piston formed by the dome-member 16.

Now, having described our invention, what we claim and desire to secure by Letters Patent is:

1. In a device of the class described, the combination with a housing having water inlet and discharge passages, and a valve controlling main ports opening from said inlet to said discharge passages, of a piston for actuating said valve, there being a chamber above said piston normally filled with water at inlet pressure and tending to close the valve, an annular chamber at the lower side of the piston being constantly exposed to inlet pressure tending to open the valve, means for relieving the pressure above the valve to enable opening thereof by the inlet pressure in the annular chamber, and means forming a chamber below the piston and for feeding to said chamber when the valve is open a balancing water-pressure tending to retard closing of the valve, there being a constant vent from the latter chamber whereby the balancing pressure therein is maintained below the inlet pressure.

2. In a device of the class described, a cylindrical body-member having a discharge-passage at the bottom thereof and a pressure-chamber in the upper portion thereof, means forming an annular valve-seat in the body-member near the bottom thereof, a valve comprising a hollow cylindrical portion engagable with the annular valve-seat and having a piston-like head-portion movable within said pressure-chamber, means for supplying water under pressure around said valve beneath said head-portion, the latter working loosely within the body-member whereby to limitedly admit water under pressure to said chamber above the valve head-portion, a fixed member fitting slidably within the cylindrical portion of the valve whereby to form therein a balancing-chamber, there being a vent from said balancing-chamber to the discharge-passage and feed-ports for admitting water to said chamber from the source of supply, said ports opening inside the annular valve-seat and being closed when the valve is seated, and a manually openable relief-valve controlling a passage from the pressure-chamber to the discharge-passage.

3. In a flush-valve, a cup-shaped main valve having an enlarged head-portion, a body-member enclosing said main valve and having a bottom discharge-passage and a supply-passage for admitting water under pressure around the valve beneath the head-portion thereof, the upper part of said body-member forming a pressure-chamber in which the head-portion of the valve fits loosely whereby to limitedly admit water under pressure to said chamber, a cylindrical dome-member over which the valve fits slidably whereby to form a variable balancing chamber between the heads of said valve and dome-member, said dome-member having at the bottom thereof an annular seat connected with the body-member between the supply-passage and discharge-passage and engageable by the lower annular edge of the main valve, there being ports in the sides of the dome-member communicating with the discharge-passage and closed by engagement of the main valve with said annular seat, means for admitting water to said balancing-chamber when the valve is raised from said seat, there being a vent from said balancing-chamber to the discharge-passage, and means for relieving water pressure from the pressure-chamber.

4. Mechanism as set forth in claim 1, including means for adjusting the vent from the balancing chamber to vary the rate of closing of the valve.

ROBERT NICHOLS.
THOS. L. TITUS.